(12) United States Patent
Hollinrake et al.

(10) Patent No.: US 6,394,735 B2
(45) Date of Patent: May 28, 2002

(54) COMBINATION DUMP AND SPREADER APPARATUS

(75) Inventors: Mark Stephen Hollinrake, Cedar Rapids; Timothy Ray Schenk; David Alan Cabalka, both of Manchester, all of IA (US)

(73) Assignee: Henderson Manufacturing Co., Manchester, IA (US)

( * ) Notice: Subject to any disclaimer, the term of this patent is extended or adjusted under 35 U.S.C. 154(b) by 0 days.

(21) Appl. No.: 09/822,538

(22) Filed: Mar. 30, 2001

Related U.S. Application Data

(62) Division of application No. 09/256,053, filed on Feb. 23, 1999.

(51) Int. Cl.[7] .............................. B60P 1/16; B60P 1/26; B60P 1/36; B60P 1/40
(52) U.S. Cl. ....................... 414/519; 414/489; 414/502; 414/528
(58) Field of Search ................................. 414/489, 502, 414/519, 528; 298/23 R; 239/657, 672, 673; 198/832, 834

(56) References Cited

U.S. PATENT DOCUMENTS 1,805,489 A    5/1931   Kerr et al.

(List continued on next page.)

FOREIGN PATENT DOCUMENTS

| CA | 989357    | 5/1976  |
|----|-----------|---------|
| CA | 2206630   | 5/1997  |
| DE | 1115282   | 10/1961 |
| DE | 1950510   | 11/1966 |
| DE | 1759773   | 2/1970  |
| DE | 7128716   | 6/1972  |
| FR | 548371    | 1/1923  |
| FR | 2427770   | 1/1980  |
| FR | 2 546 115 | 11/1984 |
| FR | 2 658 765 | 8/1991  |
| SU | 958573    | 9/1982  |
| SU | 967340    | 10/1983 |
| SU | 1283130   | 1/1987  |

OTHER PUBLICATIONS

Air–Flow Manufacturing, Convey'Or Dump (no date of publication listed).
Air–Flow multi–Purpose (Oct. 1, 1991).
All Purpose Body Swenson (Feb. 13, 1995).
APB All Purpose Body Swenson Spreader (Oct. 1995).

(List continued on next page.)

*Primary Examiner*—James W. Keenan
(74) *Attorney, Agent, or Firm*—Leydig, Voit & Mayer, Ltd.

(57) ABSTRACT

A vehicle including a combination body for selectively dumping and spreading materials. The vehicle includes, at least, a chassis and a body pivotably secured to the chassis at a hinge. The body is comprised of front and rear ends having upper and lower edges and first and second side walls having lower edges. A hoist is provided which extends between the body and the chassis for pivoting the body about the hinge. A conveyor assembly is also included, the assembly comprising an endless conveyor disposed adjacent to at least a portion of the lower edges of the side walls and extending beyond the rear end of the body; a tailgate pivotably connected to the rear end of the body and having an opening therein to permit material to be transported therethrough by the endless conveyor, the tailgate being selectively pivotable with respect to the body about a lower axis disposed adjacent the lower edge of the tailgate or about an upper axis disposed adjacent the top edge of the tailgate; a cover assembly extending rearwardly from the tailgate which is pivotably attached to the tailgate at a pivot axis, wherein the cover assembly rotates about the pivot axis upon contact with the conveyor assembly when the tailgate pivots about the lower axis; and a spreader cooperating with the conveyor assembly for spreading the material.

19 Claims, 9 Drawing Sheets

U.S. PATENT DOCUMENTS

| | | |
|---|---|---|
| 1,928,859 A | 10/1933 | Kutscha |
| 2,057,759 A | 10/1936 | Bissell |
| 2,060,652 A | 11/1936 | Arnold |
| 2,233,111 A | 2/1941 | Roberts |
| 2,267,526 A | 12/1941 | Kutscha |
| 2,303,876 A | 12/1942 | Gaddis |
| 2,422,268 A | 6/1947 | Symonds |
| 2,517,151 A | 8/1950 | Weston |
| 2,577,310 A | 12/1951 | Connelly |
| 2,609,952 A | 9/1952 | Balzer et al. |
| 2,647,756 A | 8/1953 | Allersma |
| 2,697,609 A | 12/1954 | Chase et al. |
| 2,698,184 A | 12/1954 | Bowen |
| 2,705,149 A | 3/1955 | Torrey |
| 2,870,923 A | 1/1959 | Jewell et al. |
| 2,967,056 A | 1/1961 | D'Amato |
| 2,988,368 A | 6/1961 | Kerr |
| 3,013,803 A | 12/1961 | Piester |
| 3,018,908 A | 6/1962 | Wilton et al. |
| 3,064,837 A | 11/1962 | Manney |
| 3,075,777 A | 1/1963 | Conibear |
| 3,093,254 A | 6/1963 | Sammarco |
| 3,113,784 A | 12/1963 | Swenson et al. |
| 3,147,870 A | 9/1964 | Urban et al. |
| RE25,709 E | 1/1965 | Swenson et al. |
| 3,167,319 A | 1/1965 | Kerr |
| 3,179,272 A | 4/1965 | Goldberger |
| 3,189,202 A | 6/1965 | Hansen |
| 3,189,355 A | 6/1965 | Swenson et al. |
| 3,300,068 A | 1/1967 | Tarrant, Sr. |
| 3,317,066 A | 5/1967 | Hamm |
| 3,329,436 A | 7/1967 | Fyrk |
| 3,332,691 A | 7/1967 | Swenson et al. |
| 3,344,993 A | 10/1967 | Wilder et al. |
| 3,366,281 A | 1/1968 | Wilder |
| 3,377,030 A | 4/1968 | Swenson |
| 3,412,943 A | 11/1968 | Lewis et al. |
| 3,419,221 A | 12/1968 | Fyrk |
| 3,429,418 A | 2/1969 | Fyrk |
| 3,498,486 A | 3/1970 | Freeman |
| 3,550,866 A | 12/1970 | Swenson |
| 3,583,645 A | 6/1971 | Murray et al. |
| 3,583,646 A | 6/1971 | Bogenschutz |
| 3,610,474 A | 10/1971 | Usher et al. |
| 3,647,096 A | 3/1972 | Holland |
| 3,693,890 A | 9/1972 | Torrey |
| 3,700,283 A | 10/1972 | Birdsall |
| 3,768,737 A | 10/1973 | Tobias |
| 3,776,431 A | 12/1973 | Riley |
| 3,782,570 A | 1/1974 | Sunderman |
| 3,782,634 A | 1/1974 | Herman |
| 3,790,090 A | 2/1974 | Lorenc et al. |
| 3,827,753 A | 8/1974 | Pitts |
| 3,866,770 A | 2/1975 | Palmer |
| 4,005,790 A | 2/1977 | Holland |
| 4,056,283 A | 11/1977 | Pow |
| 4,124,167 A | 11/1978 | Coleman |
| 4,157,150 A | 6/1979 | Hetrick |
| 4,162,766 A | 7/1979 | Ten Broeck et al. |
| 4,266,731 A | 5/1981 | Musso, Jr. |
| 4,317,592 A | 3/1982 | Newman et al. |
| 4,326,673 A | 4/1982 | Thene |
| 4,345,869 A | 8/1982 | King |
| 4,405,089 A | 9/1983 | Taylor |
| 4,492,490 A | 1/1985 | Christine et al. |
| 4,522,341 A | 6/1985 | Wall et al. |
| 4,531,780 A | 7/1985 | Boczkiewicz |
| 4,549,697 A | 10/1985 | Manon |
| 4,556,323 A | 12/1985 | Elkin |
| 4,568,028 A | 2/1986 | Verseef et al. |
| 4,568,237 A | 2/1986 | Krause et al. |
| 4,583,693 A | 4/1986 | Harder |
| 4,664,583 A | 5/1987 | Gust |
| 4,685,619 A | 8/1987 | Harder |
| 4,755,059 A | 7/1988 | Elkin |
| 4,767,063 A | 8/1988 | Wall et al. |
| 4,768,884 A | 9/1988 | Elkin |
| 4,772,072 A * | 9/1988 | Vick, Jr. ..................... 222/108 |
| 4,773,598 A | 9/1988 | Jones |
| 4,784,563 A | 11/1988 | Esh et al. |
| 4,790,715 A | 12/1988 | Alexander |
| 4,842,440 A | 6/1989 | Alguire |
| 4,874,283 A | 10/1989 | Hurley, Jr. |
| 4,886,214 A | 12/1989 | Musso, Jr. et al. |
| 4,925,356 A | 5/1990 | Snead et al. |
| 4,995,773 A | 2/1991 | Lamoureux et al. |
| 5,069,392 A | 12/1991 | Wise et al. |
| 5,090,773 A | 2/1992 | Guillaume |
| 5,096,125 A | 3/1992 | Wise et al. |
| 5,170,947 A | 12/1992 | Houle et al. |
| 5,186,396 A | 2/1993 | Wise et al. |
| 5,265,940 A | 11/1993 | Ostermeyer |
| 5,286,158 A | 2/1994 | Zimmerman |
| 5,310,119 A | 5/1994 | Musso, Jr. et al. |
| 5,326,156 A | 7/1994 | Heider et al. |
| 5,397,172 A | 3/1995 | Musso, Jr. et al. |
| 5,400,974 A | 3/1995 | Musso, Jr. et al. |
| 5,437,499 A | 8/1995 | Musso |
| 5,466,112 A | 11/1995 | Feller |
| 5,618,002 A | 4/1997 | Carvelli et al. |
| 5,653,567 A * | 8/1997 | Taylor ........................ 222/505 |
| 5,772,389 A | 6/1998 | Feller |
| 5,782,524 A | 7/1998 | Heider et al. |
| 5,813,613 A | 9/1998 | Keenan et al. |
| 5,890,867 A * | 4/1999 | Hagemeyer .................. 222/556 |
| 6,186,731 B1 * | 2/2001 | Vickers et al. .............. 222/415 |
| 6,220,532 B1 * | 4/2001 | Manon et al. .............. 239/672 |
| 6,308,900 B2 * | 10/2001 | Geroux et al. .............. 239/379 |

OTHER PUBLICATIONS

Frink, FR 1012 Combination Two–Way Dump Spreader (no date of publication listed).

Frink, GI 5973 Combination Two–Way Dump Spreader (no date of publication listed).

Henderson Chief, HERO Spread–All & Dump–All (no date of publication listed).

Henderson Chief, PWS–I Liquid Pre–Wet Spray System (1995).

Henderson Manufacturing Brochure, MUNIbody (1997).

Henderson Manufacturing Snow Control Issue, "Henderson Introduces All–Season Truck for Snow and Ice Control," pp. 50–56 (no date of publication listed).

J&J Truck Bodies and Trailers, DYNA Hauler/DDS (no date of publication listed).

London Machinery Inc., 500 Series Single Axle Two–Way Dump (no date of publication listed).

London Machinery Inc., 500 Series Tandem Two–Way Dump (no date of publication listed).

London Machinery, Inc. Brochure, UNI–DUMP, (1997).

Mead, Geoff "Rubber Floored Body Cuts Weight by Six Tonne," *Construction Plant & Equipment*, vol. 13(8), pp. 19–20 (May 1985).

Michel Gohier Ltee Steel and Aluminum Dump Bodies, The 4 Seasons (no date of publication listed).

Monroe Snow & Ice Control, Eliminator (no date of publication listed).

Monroe Snow & Ice Control, Radius Dump Spreader (no date of publication listed).

Monroe Truck Equipment, Cives Viking Tenco (no date of publication listed).

Monroe Truck Equipment, Monroe Duz More (no date of publication listed).

The Heil Co., The Heil Spread–n–Dump (no date of publication listed).

The Heil Co., Winder (no date of publication listed).

Usemco Rock Box (no date of publication listed).

Viking Cives Ltd., The Tough VCL 11 Dual Dump/Spreader (no date of publication listed).

* cited by examiner

COMBINATION DUMP AND SPREADER APPARATUS

This application is a division of Ser. No. 09/256,053 filed Feb. 23, 1999.

FIELD OF THE INVENTION

The present invention relates generally to a combination dump and spreader apparatus which, when mounted onto a vehicle chassis, provides for selective dumping and spreading of material from the apparatus, advantageously granular material such as sand, salt and the like, onto surfaces such as roadways.

BACKGROUND OF THE INVENTION

Many types of vehicles are available with an apparatus mounted thereon which provide for both the dumping and spreading of material, such as sand, salt, gravel, asphalt and the like, onto a surface. One type of apparatus which provides this dual functionality is commonly referred to as a combination body. Combination bodies are so named because they provide, in combination, both dumping and spreading functions. Examples of combination bodies are provided by U.S. Pat. Nos. 5,400,974 and 5,772,389.

In general, combination bodies are pivotally mounted onto the chassis of a vehicle, typically a truck chassis. Although the bodies can be mounted so as to pivot in one or more directions, the most common mounting arrangement provides a hinge mechanism on the rear of the body and a hydraulic cylinder on the front of the body, wherein movement of the cylinder causes the body to pivot about the rear hinge mechanism. This pivoting movement provides the bodies with the ability to dump material from the rear of the bodies.

Conventional combination bodies further include a conveyor system that transports material residing within the body out of the body and into one or more spreaders mounted on the exterior of the vehicle. Such conveyor systems typically include a longitudinal endless conveyor located within the body that transports the material from the front to the rear of the body or, alternatively, from the rear to the front of the body. The former situation typically results in a deposit of the material into a conventional spreader mounted on the rear of the vehicle. In the latter situation, however, the material is transported out of the front of the body, through a gate, and onto another part of the conveyor system—a cross-conveyor, mounted on the chassis, and located adjacent the front of the body. The cross-conveyor in turn transports the material laterally to the sides of the vehicle, and deposits the material into conventional side-mounted spreaders. When a cross-conveyor is included, the body is typically elevated relative to the cross-conveyor, and thus the chassis, so the material falls downward onto the cross-conveyor, this providing for the complete transfer of material from the body to the cross-conveyor.

The endless conveyor is typically driven by a permanently mounted reversible motor located at either the front of the body, or alternatively by two motors mounted at both the front and rear of the body. An example of the latter arrangement is provided in U.S. Pat. No. 5,400,974.

Conventional combination bodies also include a tailgate that covers the rear of the body. As the tailgate is pivotally-mounted at the upper corners of the body, the tailgate can pivot into an open position when it is desired to utilize the dumping functionality of the body. Certain tailgates are also pivotally-mounted at the lower corners of the bodies, allowing the tailgate to be lowered to assist in cleaning and rear loading.

The tailgates of those conventional bodies further include at least one opening therethrough, with a second opening often provided in the front of the body. The openings provide a means by which the material, upon transport by the endless conveyor, can be expelled from the front and the rear of the body. When spreading is desired, one of both of the openings can be selectively opened or closed by operation of a feed gate mounted so as to cover the opening. The feed gate further provides a means for metering the flow of material through the opening, and into the cross-conveyor or rear-mounted spreader. Upon being expelled from the body through the tailgate opening, the material is directed into the rear spreader at least in part by a cover affixed to the tailgate.

Various cover designs have been utilized in combination bodies. One common type extends forward, into the body itself, and is designed to collapse when the tailgate is lowered. This type of cover, however, has heretofore only been used in bodies wherein the conveyor resides completely within the confines of the body. Another type of cover extends rearwardly from and is affixed to the tailgate. This cover, utilized in bodies wherein the endless conveyor extends rearward of the tailgate, is located above and adjacent to the tailgate opening, and is permanently affixed in this position.

While existing combination dump and spreader bodies provide many desirable features and advantages, there remain certain problems with these combination bodies. For example, and as mentioned previously, one type of combination body includes an endless conveyor that extends beyond the tailgate. When such an extended endless conveyor is utilized, any rearwardly-extending cover that is affixed to the tailgate interferes with and precludes the lowering of a tailgate that is pivotally-mounted at the lower corners of the body. This lack of pivot capability along the lower edge of the tailgate of these bodies interferes with rear loading and clean-out of the body. While the forward-extending cover allows the tailgate to be lowered, its design is complex, and its forward-extending position does not adequately address the material flow issues presented by an endless conveyor that extends rearward of the tailgate.

In addition, the inclusion of a complex conveyor assembly that includes both an endless conveyor and a cross-conveyor typically requires the body to be mounted higher on the chassis as compared to dump bodies without a cross-conveyor. While this mounting arrangement provides for desired gravity feed of material from the endless conveyor onto the cross-conveyor, this arrangement also provides an the vehicle with a relatively high center of gravity when compared to dump bodies with the same capacity but without a cross-conveyor. Vehicles with a high center of gravity are not desirable because of the associated adverse effect on vehicle handling.

Another issue with conventional bodies is that there exists no flexibility in adapting the conveyor drive mechanism to address differences in customer needs, either during production or after delivery.

In view of the foregoing, there exists various needs in the art. One such need is for a combination body which provides both the functionality of a cross-conveyor and a relatively low center of gravity without unduly compromising the material holding volume. A further need exists for a simple means by which conventional rear loading and cleaning of a combination body can be undertaken when the body includes an endless conveyor that protrudes beyond the tailgate and a rearwardly-extending cover. An additional need is for a combination body that provides for ready adaptation of the conveyor system to meet changing customer requirements, both in the manufacturing process and after delivery.

SUMMARY OF THE INVENTION

The present invention addresses the foregoing and other needs by providing a combination body for selectively dumping and spreading materials. In one aspect of the present invention, there is provided a vehicle including a combination body for selectively dumping and spreading materials. The vehicle includes, at least, a chassis and a body pivotably secured to the chassis at a hinge. The body is comprised of front and rear ends having upper and lower edges and first and second side walls having lower edges. A hoist is provided which extends between the body and the chassis for pivoting the body about the hinge. A conveyor assembly is also included, the assembly comprising an endless conveyor disposed adjacent to at least a portion of the lower edges of the side walls and extending beyond the rear end of the body; a tailgate pivotably connected to the rear end of the body and having an opening therein to permit material to be transported therethrough by the endless conveyor, the tailgate being selectively pivotable with respect to the body about a lower axis disposed adjacent the lower edge of the tailgate or about an upper axis disposed adjacent the top edge of the tailgate; a cover assembly extending rearwardly from the tailgate which is pivotably attached to the tailgate at a pivot axis, wherein the cover assembly rotates about the pivot axis upon contact with the conveyor assembly when the tailgate pivots about the lower axis; and a spreader cooperating with the conveyor assembly for spreading the material.

In another aspect of the present invention, a combination body is provided with a conveyor assembly that comprises a cross-conveyor located adjacent the front end of the aforesaid body having an upper outer surface that extends along a cross-axis and an endless conveyor having an upper surface disposed adjacent to at least a portion of the bottom edges of the side walls. In this aspect, the upper surface of the endless conveyor is located at substantially the same level as or lower than the upper outer surface of the cross-conveyor.

A further aspect of the present invention provides a combination body with a conveyor assembly comprising an endless conveyor disposed adjacent to at least a portion of the bottom edge of each side wall, the endless conveyor comprising an endless carrier entrained around front and rear sprockets, and at least three positions which provide for the removable mounting of at least one motor in any of those positions, wherein the at least one motor, when so mounted, is drivingly connected to the sprockets.

Yet another aspect of the present invention provides a combination body having two side walls, wherein at least one of the side walls comprises upper and lower surfaces. In this aspect, the upper surface is planar and oriented in a substantially vertical position and the lower portion is planar and extends upwardly from the bottom edge of the side wall toward the upper surface at an angle of from about 10 degrees to about 50 degrees from horizontal.

The foregoing and other aims, objectives, and features of the invention will become more apparent from the following detailed description when reviewed in conjunction with the accompanying drawings.

While the invention is susceptible of various modifications and alternative constructions, certain illustrative embodiments thereof have been shown in the drawings and will be described below in detail. It should be understood, however, that there is no intention to limit the invention to the specific forms disclosed in this written description. On the contrary, the intention is to cover all modifications, alternative constructions and equivalents falling within the spirit and scope of the invention as defined by the written description and appended claims.

DETAILED DESCRIPTION OF THE PREFERRED EMBODIMENT

Figure 1:
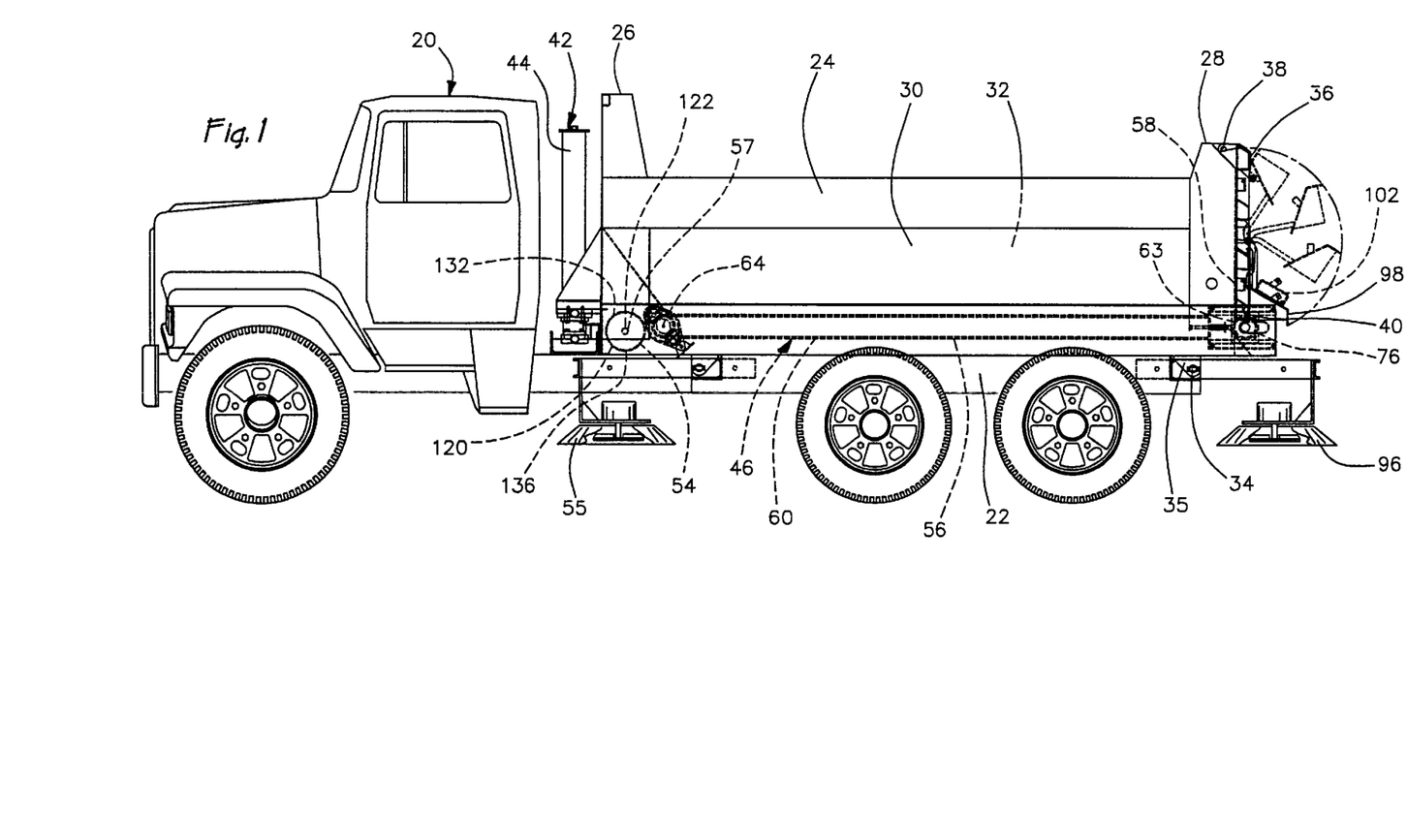
FIG. 1 is a side view of a combination body mounted onto a vehicle in accordance with a preferred embodiment of the present invention.

Referring to FIG. 1, a vehicle 20 having a combined dump and spreader apparatus, also known as a combination body, for dumping or spreading materials is illustrated in accordance with a preferred embodiment of the present invention. The vehicle 20 includes a chassis 22 and a combination body 24 mounted onto the vehicle chassis for holding materials. The body 24 has a front end 26, a rear end 28 and a pair of side walls 30, 32 extending transversely therebetween. The body 24 is secured to the chassis 22 about a pivot axis 34 which extends perpendicular to the length of the body 24. More specifically, the body 24 is connected to the chassis 22 by a hinge 35 which allows for pivoting movement about the pivot axis 34.

A tailgate 36 is provided at the rear end 28 of the body 24 and extends transversely between side walls 30, 32. The tailgate 36 is secured to the body 24 at an upper pivot axis 38 and a lower pivot axis 40, both axes 38, 40 being perpendicular to the length of the body 24. When the tailgate 36 is secured at both axes 38, 40, the tailgate 36 generally prevents material in the body 24 from exiting the rear end 28 thereof. As will be explained in more detail, the tailgate 36 may be released from the upper pivot axis 38 and pivoted about the lower pivot axis 40, thereby providing for ease in cleaning and rear loading of the body. Alternatively, the tailgate 36 may be released from the lower pivot axis 40 and pivoted about the upper pivot axis 38 when dumping is desired. If desired, the tailgate 36 may also be removed from the rear end 28 of the body 24.

To provide for the upper pivot axis 38, the tailgate 36 includes side support flanges 86 at its upper end that cooperate with the side walls 30, 32 for securing the tailgate 36 on the rear end 28 of the body 24. The support flanges 86 include holes 88 for slidably receiving pins to pivotably connect the tailgate 36 to the body 24 about the upper pivot axis 38. The tailgate 36 also includes pins 92 affixed to its lower end that extend outwards toward the side walls 30, 32. The pins 92 can be pivotably secured to mounts 94 on the body 24 to provide for pivot movement about the lower pivot axis 40 of the tailgate 36.

Figure 9:
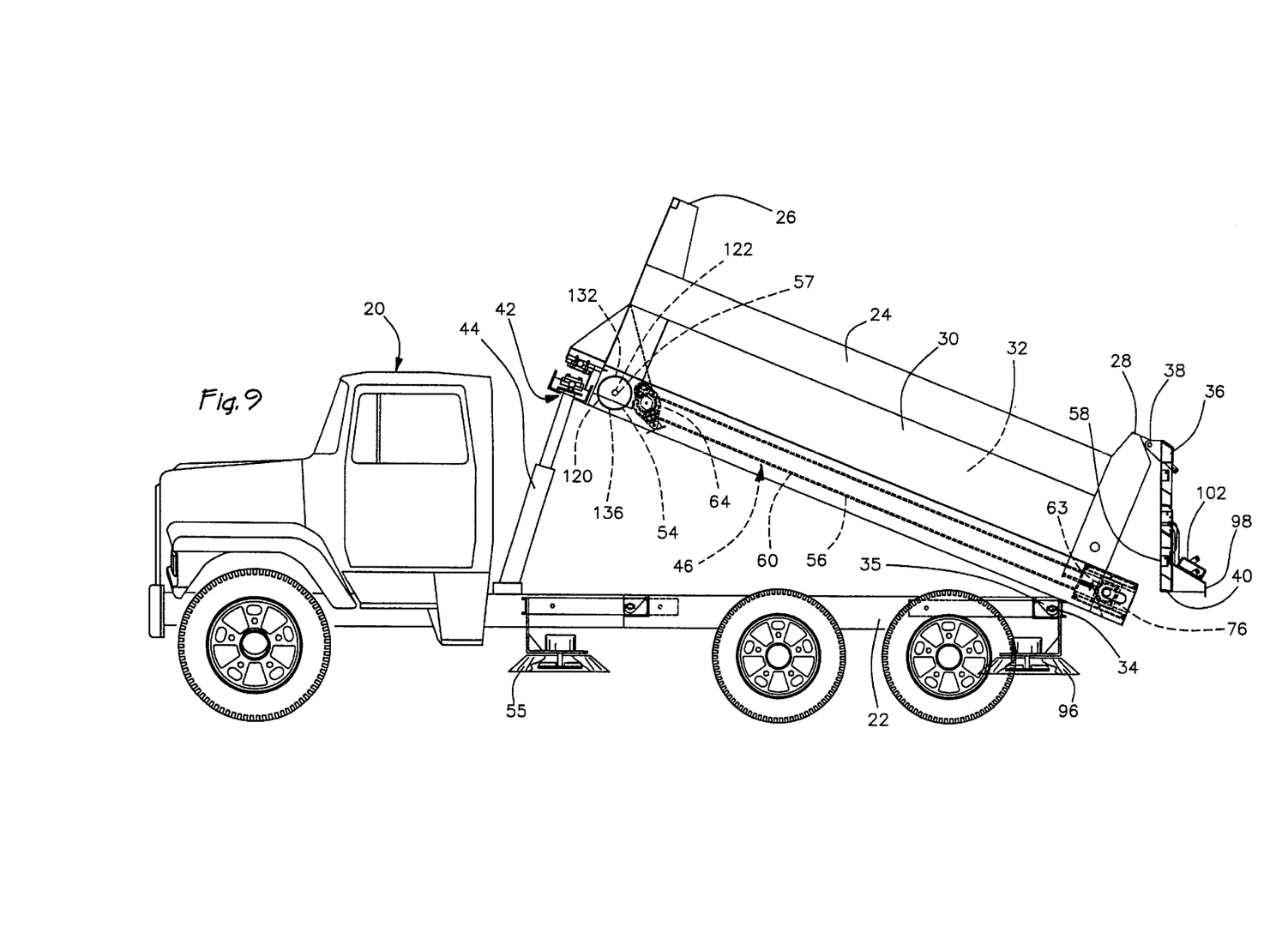
FIG. 9 is the same view as FIG. 1, but with the front of the body in a raised position and the tailgate pivoted about an upper axis.

The vehicle 20 includes a hoist 42 which typically includes a hydraulic cylinder 44 connected between the body 24 and the chassis 22 at some point forward the pivot axis 34 of the body 24. The hoist 42 is operable to pivot the front end 26 on the hinge 35 about the pivot axis 34 from a lowered position, as seen in FIG. 1, to a raised position, as seen in FIG. 9. While the tailgate 36 may remain secured during spreading, the pins 92 may be released prior to or during movement of the body 24 to allow the tailgate 36 to pivot about its upper pivot axis 38 to facilitate dumping of material from the body 24 as seen in FIG. 9.

Referring to FIGS. 1 and 4-6, there is provided a conveyor assembly 46 which includes an endless conveyor 56 on the floor of the body 24 and a cross-conveyor 54. As depicted in these figures, the endless conveyor 56 extends from the cross-conveyor 54 towards and past the rear end 28 of the body 24 and tailgate 36. While the endless conveyor can be provided in a variety of configurations, including but not limited to an auger, the preferred embodiment is illustrated and described herein.

Figure 4:
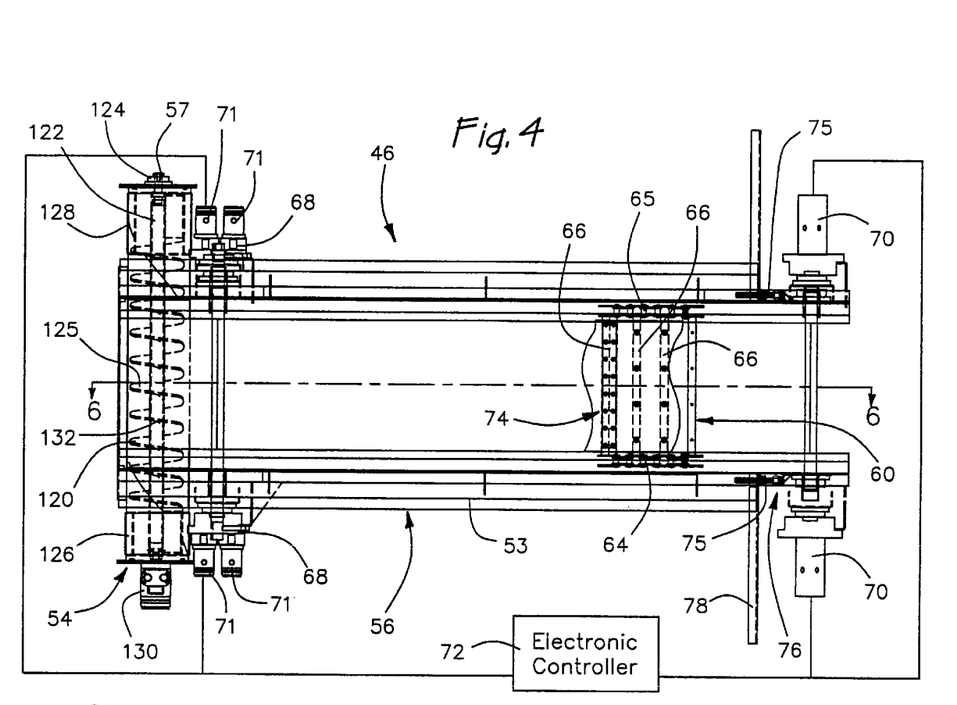
FIG. 4 is an enlarged top view of the conveyor assembly used in the vehicle of FIG. 1.
Figure 5:
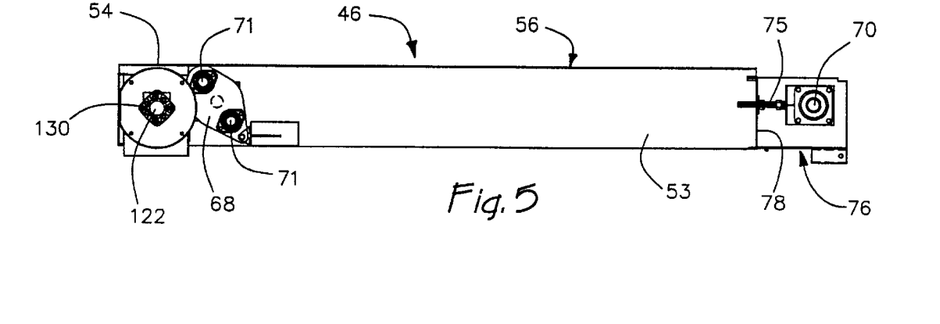
FIG. 5 is a side view of the conveyor assembly shown in FIG. 4.
Figure 6:
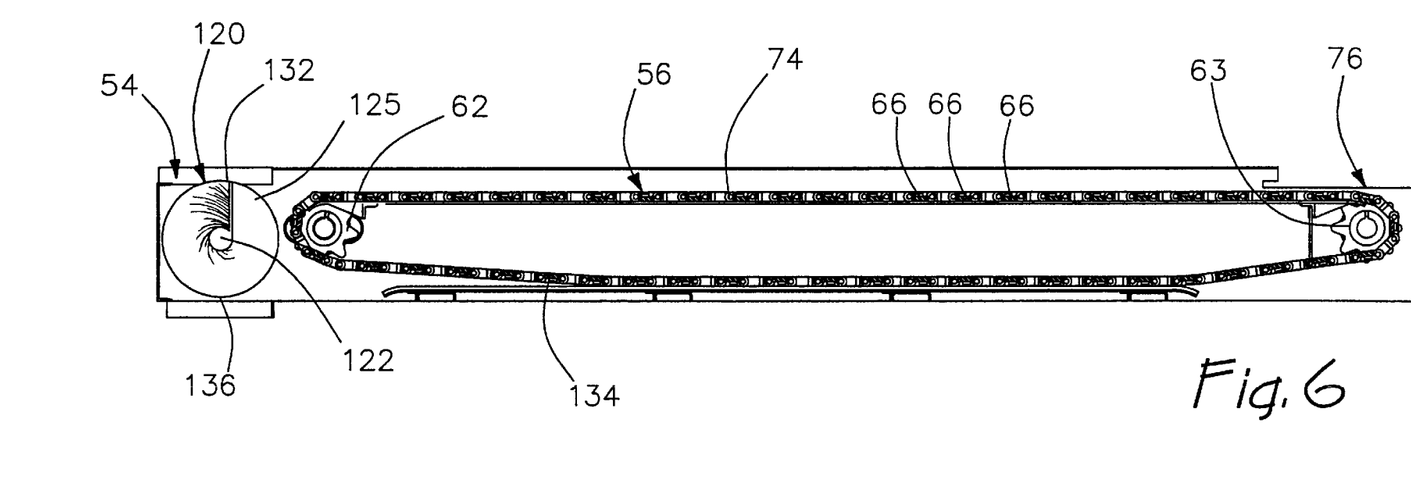
FIG. 6 is a cross-sectional view of FIG. 4 taken about line 6—6 of FIG. 4.

In the preferred embodiment shown in the figures, the endless conveyor 56 includes a carrier 60 entrained around front and rear sprockets 62, 63. The carrier 60 further includes first and second spaced apart parallel chains 64, 65 entrained directly on respective sprockets 62, 63 and a plurality of slats or bars 66 extending transversely between the first and second chains 64, 65. The bars 66 are configured to engage material in the body 24 and carry the material towards the front end 26 or alternatively toward the rear end 28 of the body 24.

In accordance with another aspect of the present invention, and as best shown in FIG. 4, the body is provided with at least three 69a, 69b, 69c, and advantageously at least four 69d, positions which allow one or more motors 70 (or gearcase-motor combination) to be removably mounted in any of the one or more positions on the body. The provision of these positions, and the provision for removable mounting of the motors, allows for ready adaptation of the body to a variety of customer-requested configurations, at the factory or at a customer's facility. For example, and depending upon anticipated needs, a customer may desire that the endless conveyor be driven only in the rearward direction. In such a case, one or optionally two motors may be removably mounted at the rear of the body. If that customer later desires to either have the conveyor move forward only, or to both the front and rear, one motor may be added to the front of the body, or one of the rear mounted motors may be removed and located at the front of the body. The provision of a variety of motor mounts also provides manufacturing flexibility, wherein only one body configuration need be provided regardless of the number of motors desired by the customer. The removable mounting of the motors may be accomplished by the use of any known fastening device, with nut and bolt fastening being preferred.

When the motors are removably mounted in the afore-described positions, they are drivingly connected to the front 62 and rear 63 sprockets of the endless conveyor 56. In the embodiment shown in FIGS. 1 and 4–6, the endless conveyor 56 is driven by least one and preferably at least two motors 71 mounted at the front of the body, preferably adjacent 69a, 69d, the front sprocket 62, and at least one and preferably at least two motors 70 mounted at the rear of the body, preferably adjacent 69b, 69c, the rear sprocket 63 of the endless conveyor 56. In this exemplary configuration, a controller 72 is connected to the front and rear motors 70, 71 for selectively operating the motors 70, 71. The motors 70, 71 may include one or more gearcases 68. In such a situation, the gearcase is in mechanical engagement with the sprockets, with one or more motors in turn being in mechanical engagement with a respective gearcase. Direct drive motors may also be advantageously used to drive the sprockets.

A controller 72 is also provided in this preferred embodiment (see FIG. 4) for activating the front motors 71 to drive the carrier 60 in one direction, preferably to the front end of the body 24, and for activating the rear motors 70 to drive the carrier 60 in the opposite direction. Preferably, the controller 72 activates only one pair of motors at a time and, therefore, when the front motors 71 are operating, the rear motors 70 are not operating, and vice-versa. An alternative embodiment provides for the activation of both front and rear motors simultaneously to drive the carrier 60. One advantage of this mode of operation is that the top 74 of the carrier 60 is always being pulled rather than pushed, the former providing for more efficient powering of the endless conveyor 56. This mode also assists in maintaining the top 74 of the carrier 60 in tension. Adjustable tension devices 75 may be incorporated to provide for ready adjustment of the tension in the carrier 60, thus maintaining efficient transfer of motion from the motors to the sprockets and ultimately to the carrier 60.

Figure 2:
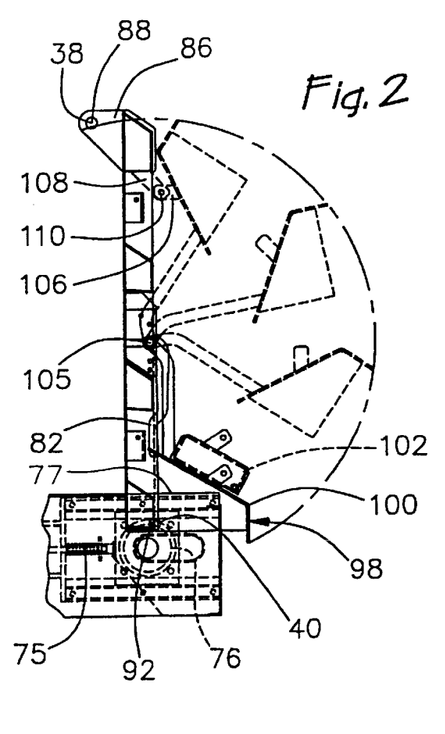
FIG. 2 is an enlarged side view of the tailgate used in the vehicle of FIG. 1.
Figure 3:
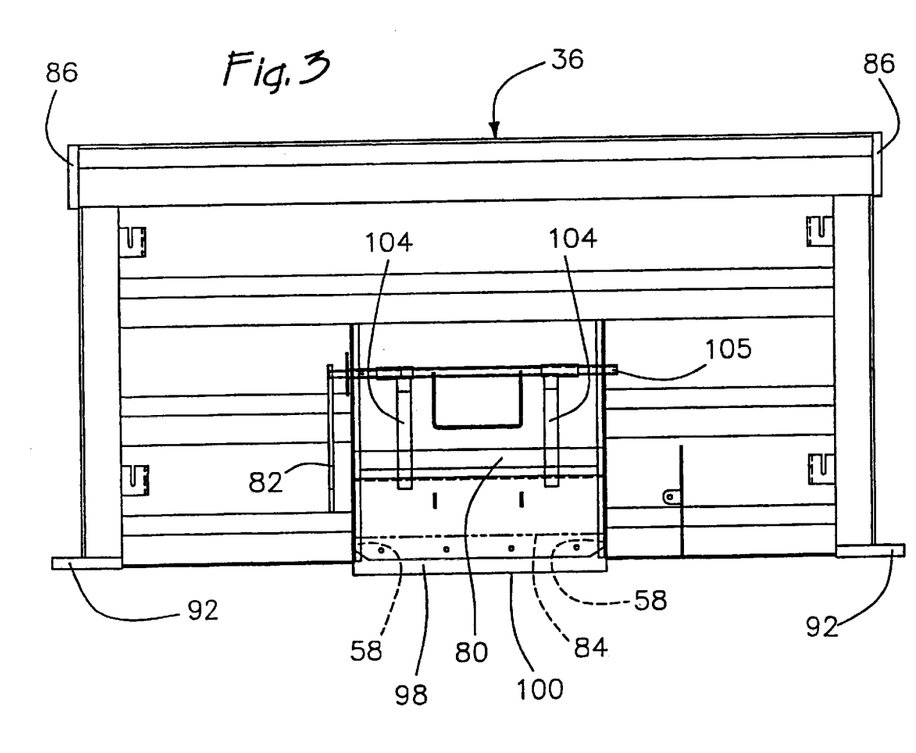
FIG. 3 is an enlarged rear view of the tailgate shown in FIG. 2.

Referring now to FIGS. 1, 2 and 3, the tailgate 36 has slidably mounted thereon a feed gate 80 over the opening 58. The feed gate 80 is selectively positioned by a control handle 82 to control the size of the opening 58 in the tailgate 36. The feed gate 80 may also close the opening 58 wherein the bottom edge 84 of the tailgate rests on or is disposed just above the carrier 60. A feed gate of similar function (not shown) may be provided at the front of the body over an opening therein to provide a degree of control over the expulsion of material from the front of the body and onto the cross-conveyor.

FIGS. 1, 2 and 9 illustrate a rear exposed portion 76. This rear portion includes what may be referred to as an asphalt lip 77 (see FIGS. 2 and 9) which extends generally substantially horizontally rearward and below the tailgate 36, and a portion of the endless conveyor 56 that projects out beyond the rear of the body and beyond the tailgate 36. The asphalt lip has a variety of functions, one of which, in the preferred embodiment, is the provision of a platform onto which the rear removable motor mounts may be located. It further provides a stable structure capable of supporting the rear sprocket of the endless conveyor 56. Advantageously, the lip 77 should extend at least six inches rearward of the body, preferably at least about 12 inches, and most preferably at least about 18 inches. It is further preferred that the asphalt lip 77 extend rearward to at least the same extent as the endless conveyor 56. The surface of the asphalt lip 77 will typically slope downward no more than about 20°, advantageously no more than about 15°, and preferably no more than about 10°, from horizontal to assist in the removal of material from the body. Most preferably, the lip 77 will slope no more than about 5°, and should be configured to accommodate paving equipment.

The endless conveyor which forms part of the rear exposed portion 76 may be located either below the lower edge of the tailgate 36 or, preferably, pass through the opening 58 in the tailgate 36. As shown in FIG. 1, a conventional rear mounted spreader 96 may be supported by the body 24 or chassis 22. The spreader 96 is preferably supported by the body 24, however, in order to maintain the relative orientation between the body 24 and spreader 96 when the body is raised while spreading. The spreader is oriented to receive material that falls from the end of the endless conveyor 56. In order to assist in properly positioning the material on the endless conveyor as it leaves the tailgate opening, and directing the material downwardly onto the rear spreader 96, a cover 98 is secured to the tailgate 36. The cover 98 extends at least partially over the portion of the endless conveyor 56 that extends beyond the tailgate 34, and is preferably configured as illustrated in FIGS. 2 and 3 to assist in providing the foregoing functions.

Figure 10:
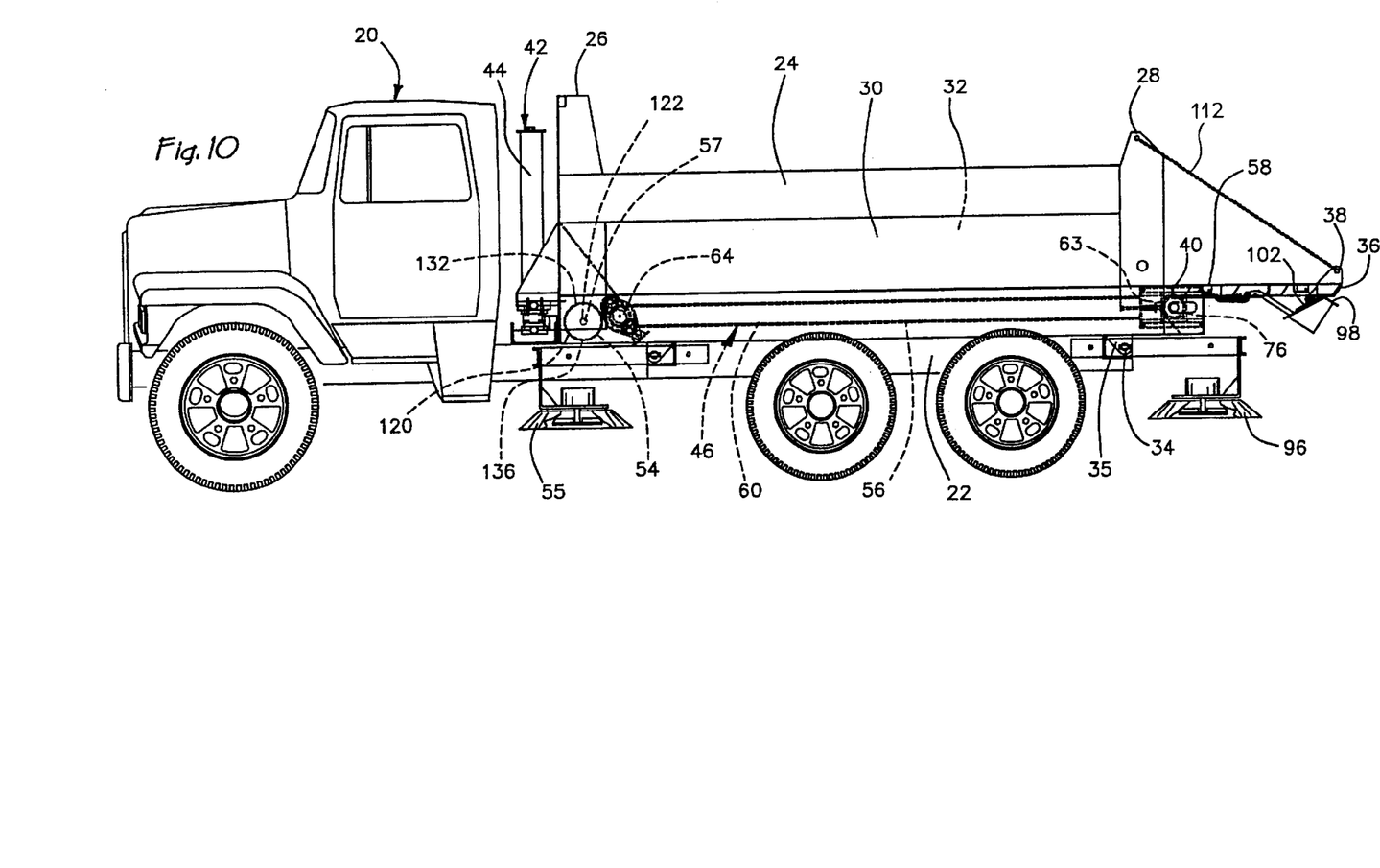
FIG. 10 is the same view as FIG. 1, but with the tailgate in a lowered position, having been pivoted about a lower axis.

In accordance with another aspect of the present invention, the cover 98 is pivotably connected to the tailgate 36. More specifically, the cover 98 includes a pair of arms 104 that have one end pivotably connected to the tailgate 36 for pivoting movement about a pivot axis 105, and another end affixed to the plate extension 100. As shown in the figures, the pivot axis 105 is preferably disposed above the opening 58 in the tailgate 36, but could be disposed in any location which provides for the advantageous functions set forth herein. In this preferred embodiment, the cover 98 can be pivoted about its pivot axis 105 from a down or lower position, as shown in FIG. 1, to an elevated position, as shown in FIG. 10. As further shown in FIG. 10, the cover 98 may be latched in the elevated position to the tailgate 36. While any latching mechanism may be used, FIG. 2 depicts the cover 98 having a tab 106 that may be latched to an ear 108 on the tailgate 36 by a pin and hole mechanism 110. In the lower position, shown in FIG. 1, the cover 98 is generally held in place by gravity, but could also be latched in place if desired. Upon operation, the weight of the cover 98 is typically sufficient to resist the force of the expelled material from the endless conveyor 56 such that the cover 98 stays in the lower position.

One important advantage of the pivoting cover 98 is that it permits the tailgate 36 to be lowered from the closed position of FIG. 1, to a lowered or open position as shown in FIG. 10, without interference between the cover 98 and the endless conveyor 56. The tailgate 36 may be held in this lowered position by chains 112 as shown in FIG. 10. During pivoting movement from the closed position shown in FIG. 1 to that in FIG. 10, the cover 98 will contact the rear portion 76 of the endless conveyor 56 which causes the cover 98 to pivot out of the way of the rear portion 76. Preferably, the cover 36 may be manually pivoted upward and latched to the tailgate through the pin and hole mechanism 110 in that elevated position before pivoting the tailgate 36 to the down position shown in FIG. 10.

Turning now to the conveyor assembly 46 as illustrated in FIGS. 1 and 4–6, the assembly 46, which includes the endless conveyor 56, may further include a cross-conveyor 54 extending laterally outward toward the sides of the vehicle 20 along a cross-axis 57, and function to deposit material into conventional side-mounted spreaders 55. While the cross-conveyor 56 is illustrated in these figures in its preferred form as an auger 120, it may alternatively be provided in the form of a conventional conveyor belt or chain system, with the top surface of the belt or chain defining the upper outer surface of the cross-conveyor. The cross-conveyor is preferably mounted onto the chassis 22.

The preferred auger 120 includes a central shaft 122 extending normal to the length of the body 24 journaled in bearings 124 for rotation. A helical screw 125 having an upper outer perimeter, or outer surface, surrounds the periphery of the shaft 122 for engaging material and transporting material towards first and second discharge ports 126, 128 at respective ends of the auger 120. While the screw 125 is shown as having the same hand threading throughout for alternatively distributing material to the first and second discharge ports 126, 128, it may also include opposing sets of threads, one hand on each half of the shaft 122, for simultaneously distributing material to both discharge ports 126, 128. Each discharge port 126, 128 is designed to feed material into a side mounted spreader 55. The shaft 122 is coupled to a drive motor 130 which powers the auger 120, the speed and, optionally the direction, of the drive motor being selectively controllable by the operator.

In accordance with another aspect of the present invention, the upper surface of the endless conveyor 56 is located at substantially the same vertical elevation or lower than the upper outer surface of the cross-conveyor. The endless conveyor 56 is at substantially the same level as the upper outer surface of the cross-conveyor when a horizontal plane simultaneously intersects both a portion of the cross-conveyor and a portion of the endless conveyor 56. In the preferred auger embodiment, as depicted in FIG. 6, the upper outer surface of cross-conveyor is the outer periphery, or top edge 132, of the helical screw 125 of the auger 120. In particular, and preferably, the outer top edge 132 is preferably disposed above the bottom return side 134 of the carrier 60, and more preferably above the axis of rotation of the front sprockets 62, while the top side 74 of the endless conveyor 56 is preferably above the bottom edge 136 of the helical screw 125 of the auger 120 and, more preferably, above the drive shaft 122 of the auger 120. At least a portion of the cross-conveyor should be disposed in relation to the body 24 to ensure the transfer of the material from the interior of the body onto the cross-conveyor.

The foregoing configuration between the cross-conveyor and endless conveyor advantageously provides for a center of gravity that is relatively lower than existing bodies having both such conveyors, without unduly sacrificing total body capacity. The lower center of gravity provides the vehicle with better handling, allowing the vehicle to make sharper turns at higher speeds than existing bodies with the aforesaid two conveyors.

Figure 7:
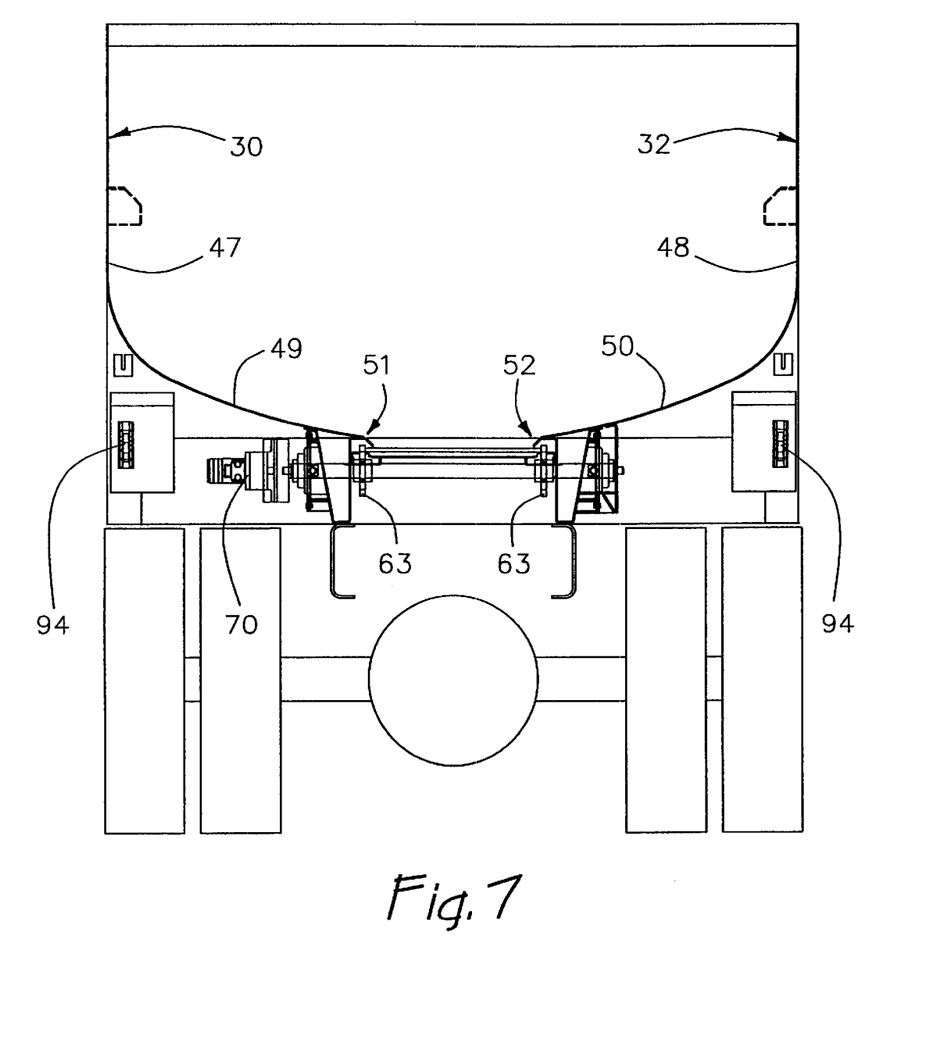
FIG. 7 is a rear view of the vehicle shown in FIG. 1 with the tailgate removed.
Figure 8:
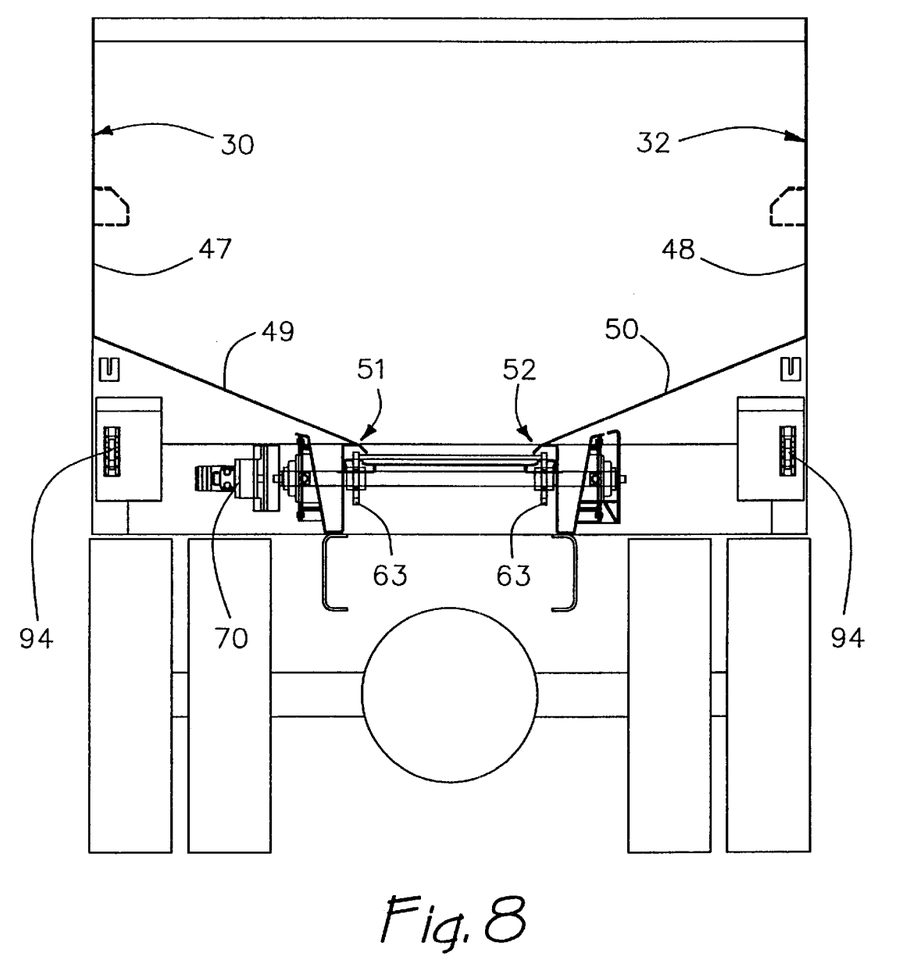
FIG. 8 is an alternative embodiment of the vehicle shown in FIG. 7.
Figure 11:
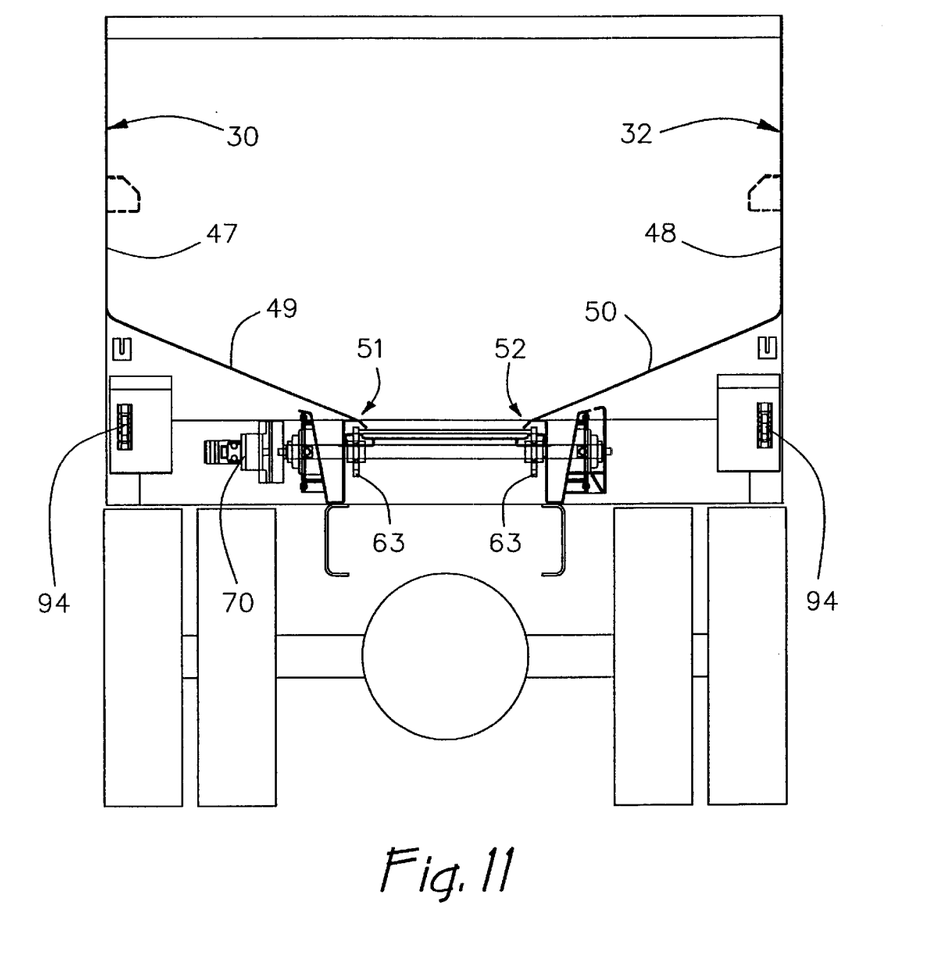
FIG. 11 is another alternative embodiment of the vehicle shown in FIG. 7.

Extending outwardly from the outer edges 51, 52 of the endless conveyor 56 are side walls 30, 32 of the body 24. These side walls include upper portions 47, 48 that extend substantially vertically upward (within about 10 degrees from vertical) and which advantageously terminate in a boxed configuration, and lower portions 49, 50 that extend from the upper portions downward and inward toward the outer edges 51, 52 of the endless conveyor 56. Although FIG. 7 illustrates side walls 30, 32 having an elliptical configuration, these walls may alternatively be provided in other curved or non-curved configurations. Examples of other side wall configurations that may be utilized in combination with the various aspects of the present invention include rectangular or square, inclined, constant radius (i.e., circular or semi-circular), or variable radius (e.g., elliptical) configurations. One example of such an alternative is shown in FIG. 8. In this figure, the side walls 30, 32 include intersecting upper 47, 48 and lower 49, 50 planar portions. FIG. 11 illustrates a further alternative embodiment, wherein the upper 47, 48 and lower 49, 50 planar portions of the side walls are joined by an intermediate curved portion. When such planar portions are utilized in the side walls, at least the lower portions are advantageously inclined from the horizontal so as to provide at least some assistance in directing the material in the body downward toward the endless conveyor 56. Advantageously, the angle of inclination of the lower portion from horizontal should be between about 10 and 50 degrees, and is preferably between about 15 and 30 degrees. In any event, the entirety of the side walls 30, 32 are configured to provide the desired body capacity and durability, and to assist in directing material in the body 24 inward toward the endless conveyor 56 to facilitate spreading.

All of the references cited herein, including patents, patent applications and publications are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and the scope of the invention as defined by the following claims.

What is claimed is:

1. A vehicle including a combination body for selectively dumping and spreading materials, the vehicle comprising:
   a chassis;
   a body pivotably secured to the chassis at a hinge, the body comprised of front and rear ends having upper and lower edges and first and second side walls having lower edges;
   a hoist extending between the body and the chassis for pivoting the body about the hinge;
   a conveyor assembly comprising an endless conveyor disposed adjacent to at least a portion of the lower edges of the side walls and extending beyond the rear end of the body;
   a tailgate pivotably connected to the rear end of the body and having an opening therein to permit material to be transported therethrough by the endless conveyor, the tailgate being selectively pivotable with respect to the body about a lower axis disposed adjacent the lower edge of the tailgate or about an upper axis disposed adjacent the top edge of the tailgate; and
   a cover assembly extending rearwardly from the tailgate which is pivotably attached to the tailgate at a pivot axis, wherein the cover assembly rotates about the pivot axis upon contact with the conveyor assembly when the tailgate pivots about the lower axis.

2. A vehicle including a combination body for selectively dumping and spreading materials, the vehicle comprising:
   a chassis;
   a body pivotably secured to the chassis at a hinge, the body comprised of front and rear ends having upper and lower edges and first and second side walls having lower edges;
   a hoist extending between the body and the chassis for pivoting the body about the hinge;
   a conveyor assembly comprising an endless conveyor disposed adjacent to at least a portion of the lower edges of the side walls and extending beyond the rear end of the body; and
   a tailgate pivotably connected to the rear end of the body and having an opening therein to permit material to be transported therethrough by the endless conveyor, the tailgate being selectively pivotable with respect to the body about a lower axis disposed adjacent the lower edge of the tailgate or about an upper axis disposed adjacent the top edge of the tailgate,
   wherein the opening of the tailgate is configured such that the tailgate is selectively pivotable about the lower axis to a substantially horizontal position.

3. The vehicle of claim 2, wherein first and second pins extend from the tailgate adjacent the lower edge of the tailgate, wherein the body further comprises first and second mounts, and the first and second pins cooperating with the first and second mounts, respectively, to pivotably connect the tailgate to the rear end of the body.

4. The vehicle of claim 3, wherein the tailgate comprises first and second side support flanges disposed adjacent the top edge of the tailgate, each side support including a hole configured to receive a removable pin, the removable pins cooperating with the first and second side walls to pivotably connect the tailgate to the rear end of the body.

5. The vehicle of claim 2, further comprising a cover assembly extending rearwardly from the tailgate, the cover assembly being pivotably attached to the tailgate at a pivot axis, wherein the cover assembly rotates about the pivot axis upon contact with the conveyor assembly when the tailgate pivots about the lower axis.

6. The vehicle of claim 5, wherein the pivot axis of the cover assembly is located above the tailgate opening.

7. The vehicle of claim 6, the tailgate further comprising a latch, the latch being configured to maintain the cover in a fixed position after the cover is moved to a position above the pivot axis.

8. The vehicle of claim 6, wherein the cover assembly includes a pair of arms, each arm having an end pivotably connected to the tailgate for pivotably moving the cover assembly about the pivot axis.

9. The vehicle of claim 5, wherein the cover assembly covers that portion of the upper surface of the endless conveyor that extends beyond the rear end of the body.

10. The vehicle of claim 2, wherein at least one side wall comprises upper and lower surfaces, wherein the upper surface is planar and oriented in a substantially vertical position and the lower portion is planar and extends upwardly from the bottom edge of the side wall toward the upper surface at an angle of from about 10 degrees to about 50 degrees from horizontal.

11. The vehicle of claim 10, wherein the lower surface of the at least one side wall extends upwardly from the bottom edge of the side wall at an angle of from about 15 degrees to about 30 degrees from horizontal, the side wall further comprising a curved portion intermediate to and joining the upper and lower portions of the side wall.

12. The vehicle of claim 2, the conveyor assembly further comprising a cross-conveyor located adjacent the front end of the body cooperatively arranged to receive material transported by the endless conveyor.

13. The vehicle of claim 12, wherein the cross-conveyor comprises an auger.

14. The vehicle of claim 2, further comprising an asphalt lip on the lower rear end of the body.

15. The vehicle of claim 2, further comprising an adjustable tension device operably engaged with the conveyor assembly.

16. The vehicle of claim 2, further comprising at least three motor mounts, wherein at least two of the motor mounts are located either adjacent the front or adjacent the rear of the body.

17. The vehicle of claim 2, further comprising a front motor drivingly connected to a front sprocket, a rear motor drivingly connected to a rear sprocket, and a controller for the front and rear motors, the controller permitting selective operation of each front and rear motor so that the carrier can be moved in a frontward direction upon operation of a front motor only, in a rearward direction upon operation of a rear motor only, or in either direction upon simultaneous operation of a front and a rear motor.

18. The vehicle of claim 17, further comprising a plurality of rear motors drivingly connected to the rear sprocket.

19. The vehicle of claim 18, further comprising a plurality of front motors drivingly connected to the front sprocket.

\* \* \* \* \*

UNITED STATES PATENT AND TRADEMARK OFFICE
CERTIFICATE OF CORRECTION

PATENT NO. : 6,394,735 B2
APPLICATION NO. : 09/822538
DATED : May 28, 2002
INVENTOR(S) : Hollinrake et al.

It is certified that error appears in the above-identified patent and that said Letters Patent is hereby corrected as shown below:

On the title page, item (75), the inventors should appear as follows:

(75) Inventors: Mark S. Hollinrake, Cedar Rapids, IA;
Timothy R. Schenk, Manchester, IA;
David A. Cabalka, Manchester, IA;
Terry J. Sommerfelt, Earlville, IA;
Thomas E. Amthauer, Strawberry Point, IA;
Marc E. Cabalka, Independence, IA;
Mart E. Ward, Manchester, IA;

Signed and Sealed this

Eighth Day of December, 2009

David J. Kappos
*Director of the United States Patent and Trademark Office*